United States Patent
Kneer

(10) Patent No.: US 6,276,558 B1
(45) Date of Patent: Aug. 21, 2001

(54) METHOD FOR PRODUCING A CONTAINER AND CONTAINER WITH PRESSURE EQUALIZATION OPENINGS

(75) Inventor: Roland Kneer, Farchant (DE)

(73) Assignee: Gaplast GmbH, Altenau (DE)

( * ) Notice: Subject to any disclaimer, the term of this patent is extended or adjusted under 35 U.S.C. 154(b) by 0 days.

(21) Appl. No.: 09/486,131

(22) PCT Filed: Aug. 5, 1998

(86) PCT No.: PCT/DE98/02254

§ 371 Date: Feb. 23, 2000

§ 102(e) Date: Feb. 23, 2000

(87) PCT Pub. No.: WO99/11451

PCT Pub. Date: Mar. 11, 1999

(30) Foreign Application Priority Data

Aug. 30, 1997 (DE) .............................. 197 37 964

(51) Int. Cl.$^7$ ...................................... B29C 49/00
(52) U.S. Cl. .................. 220/661; 220/495.04; 215/12.1; 264/155; 264/156; 264/512; 264/513
(58) Field of Search ..................... 220/660, 661, 220/495.04; 215/12.1; 264/512, 513, 155, 156, 154

(56) References Cited

U.S. PATENT DOCUMENTS 3,957,386 * 5/1976 Lupke ...................................... 408/50
4,755,401 * 7/1988 Massucco ........................ 215/12.1 X
4,892,230 * 1/1990 Lynn, Jr. ............................ 215/12.1 X
5,407,629 * 4/1995 Schmidt et al. ...................... 264/512
5,435,452 * 7/1995 Nishigami et al. ................. 215/12.1

FOREIGN PATENT DOCUMENTS 33 21091 * 12/1984 (DE) .
0 013 626 * 7/1980 (EP) .
0103343 * 3/1984 (EP) .
0 182 094 * 5/1986 (EP) .
0 759399 A1 * 2/1997 (EP) .
06 345069 * 12/1994 (JP) .
94 26498 * 11/1994 (WO) .

* cited by examiner

*Primary Examiner*—Steven Pollard
(74) *Attorney, Agent, or Firm*—Pyle & Piontek

(57) ABSTRACT

The receptacle consists of a stiff outer receptacle and an easily deformable inner bag resting on said outer receptacle, and is produced in a coextrusion-type blow molding process. The outer receptacle contains at least one pressure compensating opening through which air enters between the outer receptacle and the inner bag whenever receptacle contents is discharged, for instance, by means of a pump. The at least one pressure compensating opening is formed by the measure that a curved wall section of the outer receptacle is cut away by means of a rotating tubular knife or a hollow knife in such a manner that a hole is formed in the outer wall. During the cutting operation, which is carried out at a flat angle, the inner bag is not damaged, but pressed away inwardly.

13 Claims, 2 Drawing Sheets

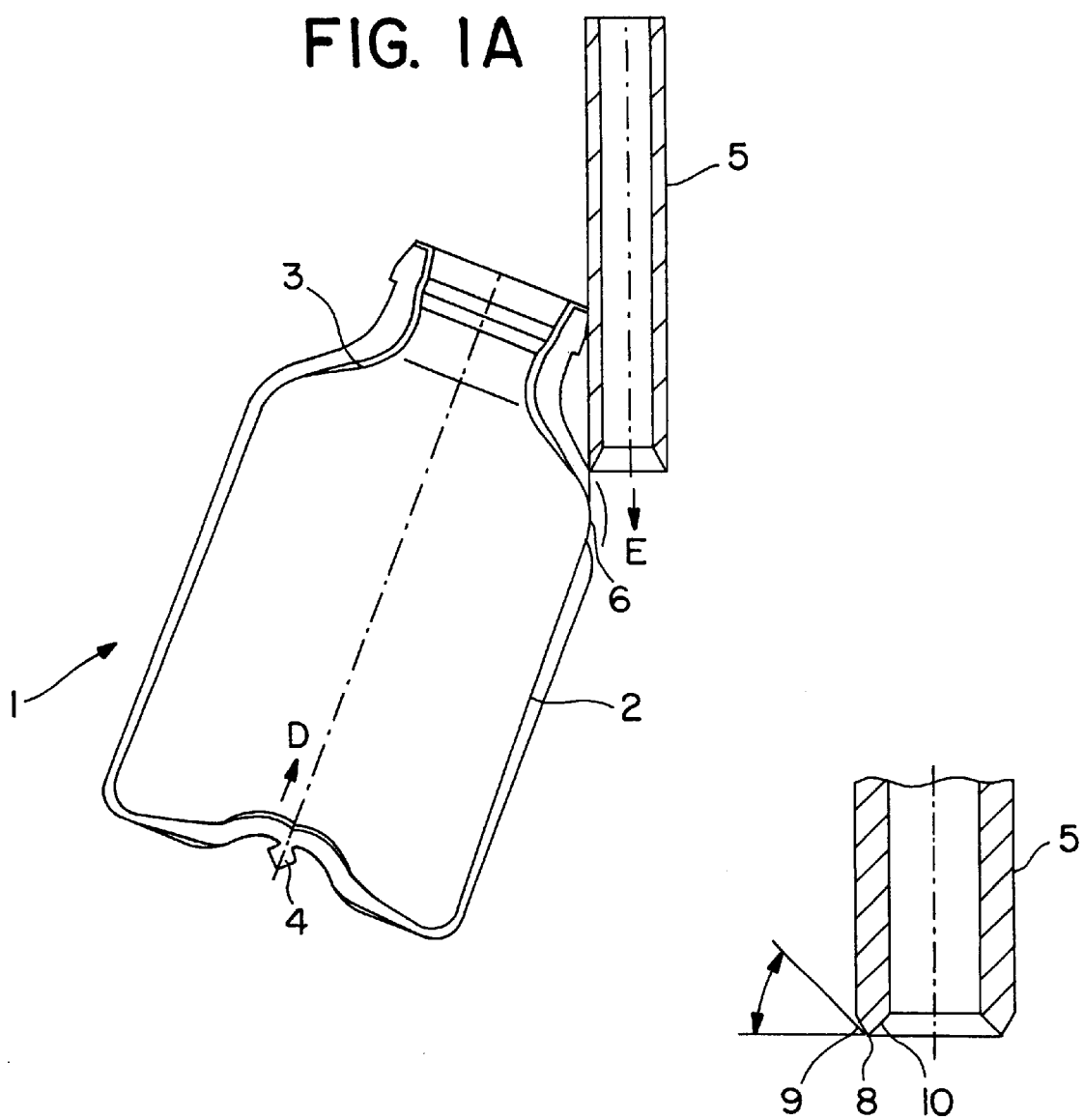
FIG. 1A
FIG. 1C
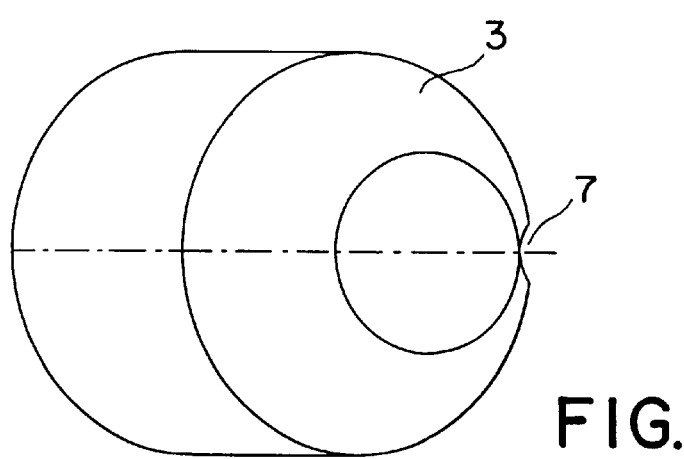
FIG. 1B

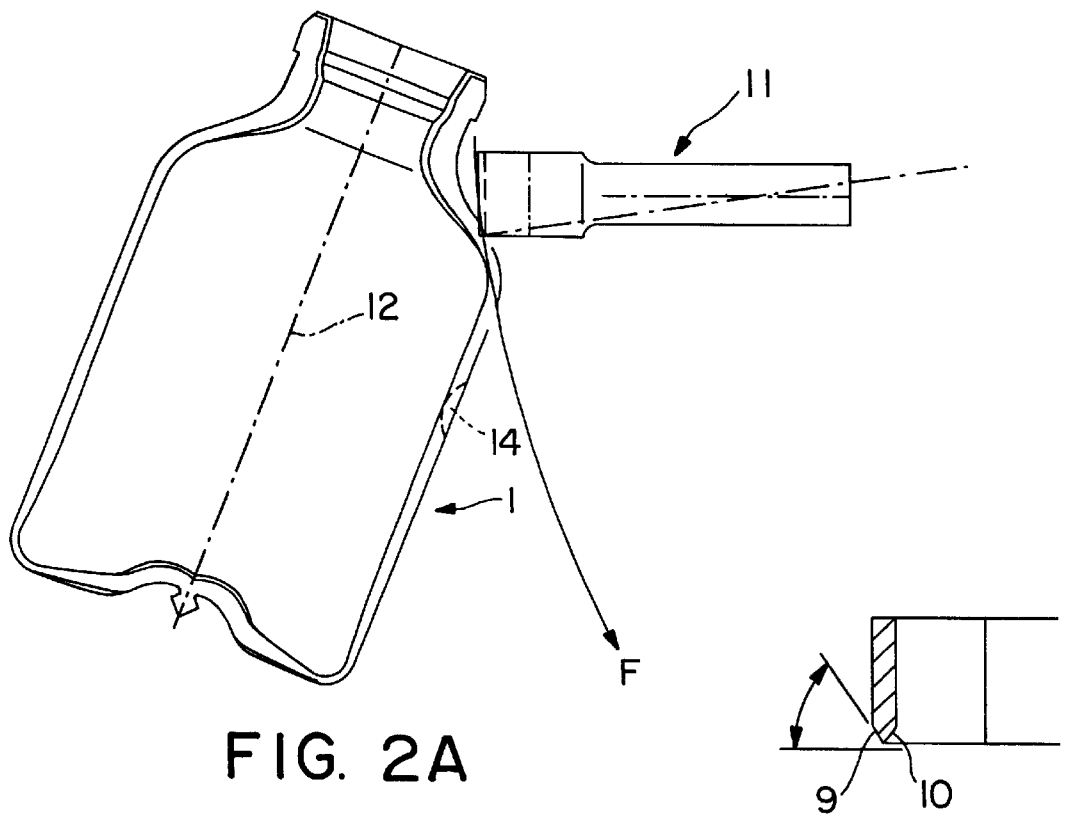
FIG. 2A
FIG. 2C
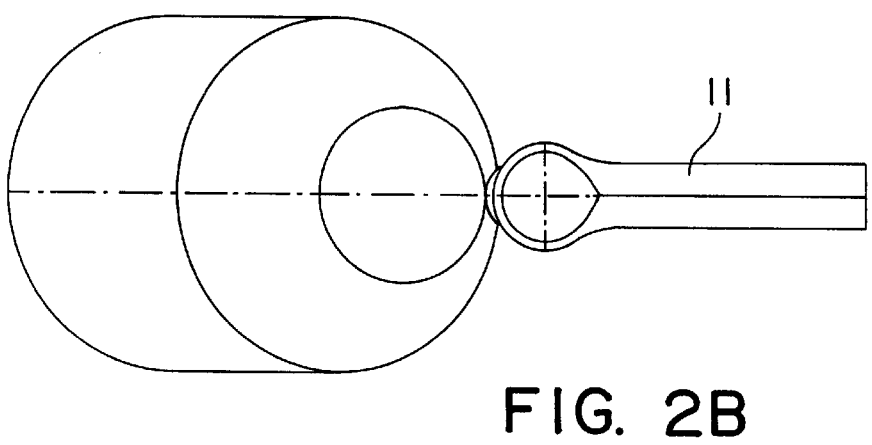
FIG. 2B

METHOD FOR PRODUCING A CONTAINER AND CONTAINER WITH PRESSURE EQUALIZATION OPENINGS

The present invention relates to a method of producing a receptacle consisting of a substantially stiff outer receptacle and an easily deformable inner bag which are made from respectively different thermoplastic materials that do not form a welded joint with one another, said receptacle comprising a receptacle opening and at least one wall opening provided in the outer receptacle, through which pressure is compensated in the area between the inner bag and the outer receptacle, with a parison, which consists of at least two tubings, being coextruded and arranged between the opened halves of a blow mold, and the blow mold being closed when said parison has reached the length required for producing the receptacle, the bottom area of the receptacle to be produced having formed therein an outwardly projecting web made of welded material of said outer receptacle, in which web the welded bottom seam of the inner bag is clamped and held in axial direction, and the parison being inflated by a pressure medium for contact with the wall of the blow mold and removed from the blow mold. Furthermore, the present invention relates to such receptacles having at least one pressure compensating opening.

A method of the type in question is disclosed in DE 41 39 555 C2. The closed and at least partly welded bottom seam of the outer receptacle is formed by shaping the squeeze area of the blow mold at the bottom side in a special manner, with excess material being squeezed off and material of the outer receptacle being united at both sides to form a web of an approximately kite-shaped cross-section from which the welded bottom seam of the inner receptacle slightly recedes towards the interior of the receptacle due to the impact pressure built up in the cavity forming the web, so that the material of the outer receptacle is welded together over part of the web. The weld seam of the inner bag is clamped in the area positioned thereabove. The projecting web provided at the bottom of the outer receptacle may also have a different cross-sectional shape, for instance an arched shape.

As for the formation of the welded bottom seam of the outer receptacle and the clamping of the weld seam of the inner bag provided at the bottom side, explicit reference is here made to the content disclosed in DE 41 39 555 C2.

A pump for discharging the receptacle contents received in the inner bag may be provided on the receptacle opening of the receptacle of the type in question. However, the receptacle may also be a squeeze-type receptacle in the case of which the outer receptacle is squeezed by hand for discharging the receptacle contents to subsequently assume its initial shape again.

In the receptacle which is known from DE 41 39 555 C2, pressure compensation which becomes necessary due to a decrease in volume of the inner bag, which has been caused by the discharge of the receptacle contents, is carried out with the aid of unwelded shoulder seams of the outer receptacle which are formed in that the coextruded blank has a diameter which is greater than the neck portion of the blow mold, so that the blank is squeezed off in the shoulder portion and on the neck of the receptacle to be produced when the blow mold is closed for eliminating excess material. This is done without the formation of an outwardly projecting web as in the case of the bottom seam so that, during the smooth squeeze-off operation in the squeeze area of the shoulder portion and of the neck portion, material of the inner bag remains between the spaced-apart material of the outer receptacle, so that the last-mentioned material cannot be welded together, since the material of the inner bag does not recede. Hence, a closed weld seam is formed on the inner bag and ensures a leakage-proof inner bag, and air can enter through the shoulder seams of the outer receptacle, which are open at both sides, from the surrounding atmosphere for pressure compensation.

This configuration has the disadvantage that, starting from the open shoulder seams of the outer receptacle, the receptacle consists of two shells which rest on one another in a substantially loose manner. When the receptacle is equipped with a pump and when the pump is put on the two neck halves in a slightly inclined manner, the two shells may get slightly displaced relative to one another, whereby a step is formed on the upper edge, as a result of which the receptacle is no longer leakproof, since even a rubber insert provided at this place could not compensate for the resulting unevenness. Moreover, only receptacles with shoulder sections can be provided in the known manner with the open pressure compensating seams, whereas in the case of so-called wide-necked vessels, which are devoid of any shoulder sections, no pressure compensating openings can be formed in this way.

EP-A-0 759 399 discloses a method according to the preamble of patent claim 1. The document suggests that a hole should be punched out of the wall of the outer receptable my means of a sharp circular cutting tool in that said cutting tool is pressed through the wall of the outer receptacle. There is the risk that the inner bag may get damaged.

It is the object of the present invention to provide a method with the aid of which in receptacles of the type under consideration pressure compensating openings can be produced in the wall of the outer receptacle in a different way than in the one offered by unwelded shoulder seams, without any leakage problems arising therefrom in the receptacle.

It is also an object to indicate a receptacle which includes at least one pressure compensating opening in its outer receptacle without the above-mentioned drawbacks being observed.

These objects are achieved by the features of patent claims 1 and 12.

Advantageous developments of the present invention are characterized in the dependent claims.

According to the present invention at least one wall opening of the outer receptacle is formed subsequent to the blow molding process in that a preferably convex wall section is cut away from the wall of the outer receptacle in such a manner that a hole is formed in the outer wall. This means that the outer wall, which the very thin, flexible inner bag rests on, is cut away completely at least in a very small portion without the inner bag being damaged thereby. This is surprising for the reason that the cutting tool which cuts away the wall section of the outer receptacle also hits on the inner bag during its cutting operation, which necessarily follows already from the fact that a certain wall surface which, among other things, depends on the size of the receptacle and the number of the wall openings must be cut away completely to form the hole in the outer receptacle. Moreover, tolerances in the wall thickness of the outer receptacle are unavoidable, the thickness ranging, for instance, from 1 to 1.5 mm, so that the cutting depth has to be set in practice in a manner to ensure that a hole leading through the outer receptacle is actually formed by the cutting operation.

Although the sharp cutting tool impinges on the inner bag, which is very thin as a rule and has a wall thickness of e.g. 0.1 to 0.25 mm, this inner bag is not damaged by the cutting tool when the tool impinges on the inner bag at a very flat angle. Since at the moment at which the wall of the outer receptacle is fully severed, air enters into the space between the outer receptacle and the inner bag, the cutting tool presses the flexible inner bag inwards without damaging said bag in a tightness-impairing manner. No wall section is cut away from the inner bag since, as mentioned, the inner bag is pressed away by the cutting tool while the cutting tool continues the cutting operation on the outer receptacle.

Wall openings can thereby be formed virtually at any place of the receptacle on the outer receptacle, with the cutting operation being preferably performed in one direction in which the outer receptacle is curved outwards. This is, for instance, the case with a circumferential wall of a receptacle that has a circular cylindrical shape, and in which one or several wall openings are preferably cut such that the cutting operation(s) is(are) substantially performed in circumferential direction, either along a straight line, so that when viewed in cross-section a circular segment is cut away along a secant line, or, however, the cutting movement may be performed in circular fashion to extend into the circumferential wall.

Of course, the wall openings can also be cut into the usually curved transition portion that leads from the circumferential wall of a receptacle to the bottom or shoulder portion thereof, with the cutting operation being performed in any desired direction thanks to the biaxial curvature of said portions.

Thus, the wall openings can virtually be formed at any desired place of the outer receptacle, and it might only be difficult to construct the wall opening in a planar region—though this should also be possible with a correspondingly adapted cutting tool and therefore lies within the scope of the present invention.

Although the cutting operation can be performed such that a wall section is cut away in several chips at a respectively increasing cutting depth, it is particularly preferred that the wall section is cut away as a single chip. The chip is here automatically lifted by the blade of the cutting tool from the outer receptacle, with an advancing spreading operation being performed when the wall of the outer receptacle is fully penetrated, i.e. air can suddenly enter into the area of the forming hole between the outer receptacle and the adjacent inner bag, whereby the inner bag can immediately detach from the outer receptacle and evade inwards upon impingement of the cutting knife. Since the wall section is cut away as one chip, the inner bag is not damaged by the cutting tool.

It is however within the scope of the invention that one or two outer chips can first be cut away, for instance, by a rotating cutting tool, this cutting operation being then followed by the inner chip which forms the hole. This can for instance be expedient in cases where a large receptacle has a considerable wall thickness or when a relatively hard material is used for the outer receptacle.

According to another suggestion of the invention a knife should be used for cutting away the wall section, the knife having an inclined flank on the outside facing the inner bag during the cutting operation. This inclined flank need not extend in a straight line, but may, for instance, have a convex rounding. This inclined flank also helps that the inner bag is not gripped by the knife and is damaged, but instead is deflected inwards.

Moreover, the inclined flank helps to spread the already cut-away part of the chip from the remaining outer wall, whereby an immediate air entry is considerably promoted upon complete passage through the wall of the outer receptacle.

The angle which is suited for the inclined outer flank of the knife depends on various factors, for instance on the wall thickness of the outer receptacle, the contour of the outer receptacle in the area where the wall opening is formed, and on the material used.

Preferably, when viewed in cross-section, the knife has a substantially roof-like shape in the area of the cutting edge, i.e. an inclined flank at each side of the cutting edge.

Furthermore, the wall opening or wall openings should advantageously be formed by cutting away a corresponding number of wall sections with a rotating tubular knife which is advanced in a direction in which the outer receptacle is curved outwards. Of course, the term "curved" also includes cases where the receptacle may have an angular shape.

The rotating tubular knife is preferably advanced along a line while rotating about its longitudinal axis, but it can also be advanced by a suitable means along a circular arc.

Alternatively, the wall section or walls sections can be cut away by a hollow knife which preferably performs a radial cutting movement although a linear cutting movement is also possible.

The invention is not limited to the use of such a knife.

Hence, according to the method of the invention, at least one wall section is cut away by a cutting tool impinging at a flat angle in such a manner that a hole is created in the wall of the outer receptacle. When viewed, this cut-away wall section is most of the time shaped as an ellipse or lentil, depending on the outer contour of the associated portion of the outer receptacle. The resulting hole can, for instance, have the size of a few square millimeters, for instance 1 to 3 mm$^2$, with the total cutting surface being considerably larger. Of course, the dimensions preferably depend on the size of the respective receptacle.

What is surprising in the method of the invention is that the cutting tool during its cutting operation normally impinges on the inner bag which, however, remains undamaged, as it is not gripped by the cutting tool, but is pressed back, so that no leakage problems arise in the inner bag.

Hence, the receptacle of the invention can virtually be provided in all portions of the outer receptacle with one, two or, if desired, more pressure compensating openings, with outwardly curved wall sections of the outer receptacle being cut away at a flat angle, resulting in approximately elliptic or lenticular cutting surfaces in the center of which a hole is located that leads through the outer receptacle. Even in cases where the inner bag has only a minimum wall thickness, it is not damaged during the cutting operation, but simply pressed back inwardly, especially since with a chip-like removal of the wall section air enters between the outer receptacle and the inner bag prior to the cutting tool impinging on the inner bag and enables the inner bag to recede.

Further details of the invention will become apparent from the following description and from the drawing, in which:

FIG. 1A shows the formation of a pressure compensating opening by means of a rotating tubular knife;

FIG. 1B is a top view on the receptacle according to FIG. 1A;

FIG. 1C is an enlarged view of the cutting area of the tubular knife;

FIG. 2A shows the formation of a pressure compensating opening by means of a radially moved hollow knife;

FIG. 2B is a top view on the arrangement of FIG. 2A; and

FIG. 2C is an enlarged view of the cutting area of the tubular knife.

FIG. 1A shows in a substantially schematic manner a method of the invention for producing the pressure compensating openings on a receptacle 1 which consists of a rigid outer receptacle 2, made for instance of polypropylene, and a soft inner bag 3, made for instance of polyethylene. In the blow mold the tubular blank which is coextruded from the corresponding two layers has been squeezed off at the bottom to form an outwardly projecting web 4 which has an approximately kite-like cross-section and has the welded bottom seam of the inner bag 3 clamped thereinto. Since during this operation the material of the inner bag has slightly receded in the direction of arrow D in FIG. 1A from the point of separation, a closed weld of the outer receptacle 2 has also been formed in the lower portion of web 4, so that the bottom of receptacle 1 is tightly sealed.

A tubular knife 5 is advanced in the direction of arrow E for forming pressure compensating openings on receptacle 1, with the knife rotating about its longitudinal axis. The tubular knife 5 cuts away a curved section 6 in the transition portion of the shoulder of the receptacle relative to the cylindrical circumferential wall of said receptacle.

During the cutting operation the tubular knife 5 strikes on the inner bag 3 at a very flat angle, thereby pressing said bag away inwardly, so that the inner bag 3 is not damaged.

FIG. 1B shows the pressure compensating opening 7 which is formed on the outer receptacle 2.

FIG. 1C shows a preferred embodiment of the tubular knife 5 which on the outside of the cutting tip 8 comprises an inclined flank 9 which in the illustrated embodiment encloses an angle of about 45° with the longitudinal axis of the tubular knife 5, without the invention being limited thereto. On the inside, too, the tubular knife has an inclined flank 10 so that when viewed in cross-section it has a roof-like shape on the whole.

Thanks to the inclined flank 9, the inner bag 3 remains undamaged during the cutting operation.

In the method of the invention which is shown in FIG. 2A in an also substantially schematic view and is used for forming a pressure compensating opening, a hollow knife 11 is used which is moved by a suitable actuating means in such a manner that it performs a radial cutting movement which is also very flat (arrow F). The hollow knife 11, however, could also perform a straight cutting movement which, for instance, extends in a direction perpendicular to the longitudinal axis 12 of the receptacle 1 and cuts away a section 14 (which is shown in broken line in FIG. 2A) from the cylindrical circumferential wall 13.

FIG. 2C is again an enlarged view showing that the cutting area of the knife employed has an outer inclined flank 9 and an inner inclined flank 10. Flank 9 is here also instrumental in passing air into the area between the outer receptacle 2 and the inner bag 3 in good time and in an efficient manner by the action of a spreading force, whereby the inner bag 3 is enabled to detach from the outer receptacle 2, with the flank 9 additionally preventing the inner bag 3 from being gripped by the cutting tip.

The flank 9 may also be given a e.g. convex cross-sectional shape.

What is claimed is:

1. A method of producing a receptacle (1) consisting of a substantially stiff outer receptacle (2) and an easily deformable inner bag (3) which are made from respectively different thermoplastic materials that do not form a welded joint with one another, said receptacle comprising a receptacle opening and at least one wall opening (7) provided in the outer receptacle (2), through which pressure is compensated in the area between the inner bag (3) and the outer receptacle (2), with a parison, which consists of at least two tubings, being coextruded and arranged between the opened halves of a blow mold, the blow mold being closed when said parison has reached the length required for producing said receptacle (1), excess material being squeezed off in the bottom area of the receptacle to be produced, and an outwardly projecting web (4) made of welded material of said outer receptacle (2) being formed, in which web the welded bottom seam of the inner bag (3) is clamped and held in axial direction, and said parison being inflated by a pressure medium for contact with the wall of the blow mold and removed from said blow mold, characterized in that said at least one wall opening (7) is formed in that a cutting tool impinges at a flat angle on the wall of the outer receptacle and, with a flat cutting movement, cuts away so much wall material that a hole is formed in the outer wall.

2. A method according to claim 1, characterized in that said wall opening is formed by cutting away a preferably single chip from the outer wall.

3. A method according to claim 1, characterized in that said wall section (6) is cut away in a direction in which the outer contour of said outer receptacle (2) extends in curved fashion.

4. A method according to claim 1, characterized in that when viewed from the top the cut-away wall section (6) has substantially the shape of an ellipse or a lentil.

5. A method according to claim 1, characterized in that said wall section (6) is cut away with a knife (5, 11) which comprises an inclined flank (9) on the outside which is facing said inner bag (3) during the cutting operation.

6. A method according to claim 5, characterized in that the used knife has substantially a roof-like shape in the area of the cutting edge when viewed in cross-section.

7. A method according to claim 1, characterized in that said wall section (6) is cut away with a rotating tubular knife (5) which is advanced in a direction in which said outer receptacle (3) is curved outwards.

8. A method according to claim 1, characterized in that said wall section (6) is cut away by a hollow knife (11) which performs a circular cutting movement.

9. A method according to claim 1, characterized in that said wall section (6) is cut away substantially in circumferential direction from the preferably cylindrical circumferential wall of said outer receptacle (3).

10. A method according to claim 1, characterized in that said wall section (6) is cut away from the curved transition portion leading from the preferably cylindrical circumferential wall to the bottom or shoulder of said receptacle.

11. A method according to claim 1, characterized in that two or more wall sections (6) are cut away.

12. A receptacle consisting of a substantially stiff outer receptacle and an easily deformable inner bag which are made from respectively different thermoplastic materials that do not form a welded joint with one another, said receptacle comprising a receptacle opening and at least one wall opening provided in the outer receptacle, through which pressure is compensated in the area between the inner bag and the outer receptacle, with said outer receptacle having a closed bottom in which the weld seam of said inner bag is clamped, characterized in that a wall section (6) of said outer receptacle (2) is cut away as at least one wall opening in a flat cutting movement in which a cutting tool impinges on the wall at a flat angle, whereby an approximately elliptic or lenticular cut surface is formed with a hole that leads through the wall of said outer receptacle (3).

13. The receptacle according to claim 12, characterized in that two or more curved wall sections of said outer receptacle (3) are cut away.

* * * * *